United States Patent [19]

Woo

[11] 4,443,568

[45] Apr. 17, 1984

[54] POLYMERIZATION PROCESS AND PRODUCT

[75] Inventor: James T. K. Woo, Medina, Ohio

[73] Assignee: SCM Corporation, New York, N.Y.

[21] Appl. No.: 314,520

[22] Filed: Oct. 26, 1981

[51] Int. Cl.³ ............................................. C08L 63/00
[52] U.S. Cl. .................................... 523/406; 523/412; 525/531
[58] Field of Search ................. 523/406, 412; 525/531

[56] References Cited

U.S. PATENT DOCUMENTS

| | | | |
|---|---|---|---|
| 3,403,088 | 9/1968 | Hart | 523/412 |
| 3,709,866 | 1/1973 | Waller | 260/27 R |
| 3,969,300 | 7/1976 | Hagath | 523/412 |
| 4,014,771 | 3/1977 | Rosenkranz | 525/531 |
| 4,190,693 | 2/1980 | Martorano | 523/412 |
| 4,212,781 | 7/1980 | Evans | 523/412 |
| 4,285,847 | 8/1981 | Ting | 525/65 |
| 4,294,741 | 10/1981 | Bozzo | 523/412 |
| 4,297,261 | 10/1981 | Jozwiak | 523/412 |

Primary Examiner—Paul Lieberman
Attorney, Agent, or Firm—Thomas M. Schmitz

[57] ABSTRACT

The product and process is directed to polymerizing second stage ethylenically unsaturated monomers within an aqueous dispersion of a preformed epoxy based resinous material comprising a mixture of graft epoxy polymer containing grafted addition polymer grafted to the epoxy backbone, ungrafted epoxy polymer, and ungrafted addition polymer uniformly dispersed in water wherein the second stage monomers are polymerized in the presence of at least 0.1% of benzoin derivative reducing agent based on monomer weight in combination with a peroxide polymerization initiator.

10 Claims, No Drawings

POLYMERIZATION PROCESS AND PRODUCT

BACKGROUND OF THE INVENTION

This invention relates to a process for increasing the addition polymer content of a resinous reaction product in a liquid vehicle. More particularly, the invention is concerned with a process for in situ polymerization of ethylenic monomers in the presence of a water-reducible, epoxy-based aqueous dispersion. The invention is also concerned with products produced by these processes, and particularly, with water-reducible, epoxy-based coating compositions. The subject matter of the present patent application is related to the subject matter of other patent applications now being U.S. Pat. No. 4,212,781 and U.S. Pat. No. 4,285,847.

Graft polymers formed between epoxy resins and polymerized addition monomers including an acrylic acid are suggested in these patents and in certain prior art for use in coating compositions.

In the art prior to U.S. Pat. No. 4,212,781 and U.S. Pat. No. 4,285,847, so-called graft polymers were formed by an esterification reaction between an acidic addition monomer or polymer and an epoxy resin to form an ester graft. The techniques for making epoxy-based resins water-dispersible, through inversion with amines, and for cross-linking them with added aminoplast, are well known. However, ester adduct products have not been satisfactory and do not have good resistance to water since the adducts are susceptible to hydrolysis.

U.S. Pat. No. 4,212,781 discloses a process for resinous compositions for use in coating compositions particularly useful as sanitary coatings, that is, as coatings for cans to contain edible materials. Such can coating compositions are easy to apply in existing equipment, have excellent shelf stability, and after application and curing have excellent functional properties as coatings and do not impart any flavor to the food or beverage in the can. The process comprises preparing a curable resinous composition having an Acid Number of at least 30, by reacting together at 90° C. to 130° C. an aromatic diepoxide resin having a molecular weight above 1,000 and addition polymerizable monomer including 10% to 80% by weight acrylic acid, the diepoxide resin being present in sufficient quantity to provide from 30% to 90% by weight of the initial reaction mixture, in the presence of a free radical initiator of the benzoyl peroxide type. During this reaction there is simultaneous addition polymerization of the monomer through its ethylenic unsaturation and grafting of addition polymer to the diepoxide resin. The acid functionality of the reaction mixture is sufficiently high to effect stable dispersion of the product in a basic aqueous medium. As is more particularly pointed out in U.S. Pat. No. 4,212,781, the resinous reaction product produced contains three polymeric components, namely, the graft polymer, ungrafted diepoxide resin, and ungrafted addition polymer. The initial epoxy resin employed in the graft polymer production process can be terminated to eliminate part or all of the terminal epoxy groups to eliminate the possibility of ester grafting, as more particularly set forth in copending application Ser. No. 793,507, filed May 4, 1977.

In U.S. Pat. No. 4,285,847, a preferred embodiment sets forth a process for polymerizing in situ an added quantity of addition polymerizable monomer containing ethylenic (vinyl) unsaturation, in an aqueous dispersion of a resinous reaction product produced in accordance with a process of one of the earlier filed patent applications described above, that contains as the resinous component thereof a mixture of graft polymer, unreacted epoxy resin, and ungrafted addition polymer. The net result of that process is to reduce substantially the percentage of epoxy resin and increase substantially the percentage of polymerized addition polymerizable monomer. Another useful result is to increase the solids content of the composition.

It now has been found that an organic reducing agent, preferably a benzoin derivative advantageously avoids redox catalyst problems that can occur in the second stage monomer polymerization step wherein ethylenically unsaturated monomers are polymerized in the presence of the preformed resinous mixture which desirably contains (a) epoxy polymer, (b) addition polymer, and (c) grafted polymer of addition polymer grafted to the epoxy backbone. Too much catalyst can cause a protective coating to exhibit a blush whereas too little catalyst causes insufficient conversion and polymerization of the monomers. In accordance with this invention, an organic reducing agent, preferably benzoin, used in conjunction with peroxide catalyst advantageously avoids the blushing problem and further provides excellent conversion of the monomers during polymerization. This advantage is particularly important where large amounts of acrylic monomers are used whereby a film blush can now be avoided. A further advantage is achieved with coating compositions synthesized with benzoin wherein the cured coatings exhibit excellent resistance to strenuous detergent testing such as a 1% boiling Joy detergent test. These and other advantages will become more apparent by referring to the detailed description of the invention and the illustrative examples.

SUMMARY OF THE INVENTION

Briefly, the process of the invention comprises the in situ polymerization of ethylenically unsaturated monomers in an aqueous dispersion of preformed resinous mixture of graft epoxy polymer containing grafted addition polymer, ungrafted epoxy polymer, and ungrafted addition polymer, wherein the improvement comprises the inclusion of at least about 0.1% of reducing agent, preferably benzoin, in combination with a peroxide initiating catalyst.

DETAILED DESCRIPTION OF THE INVENTION

The process of this invention comprises the polymerization of second stage ethylenic monomers in the presence of a water-dispersed graft polymer resinous reaction product wherein the second stage monomers are polymerized in the presence of a benzoin derivative reducing agent in combination with a peroxide initiator.

The term "graft polymer resinous reaction product" is used to refer to the reaction mixture that is produced by the addition polymerization of ethylenically unsaturated monomer in the presence of an epoxy resin containing aliphatic backbone carbons having one or two hydrogens bonded thereto in the ungrafted state, in the presence of at least 3% benzoyl peroxide (BPO) or equivalent hydrogen-extracting initiator, based on monomer. The resinous reaction product can be either acid-functional or base-functional. The resulting graft polymer resinous reaction product is a mixture of unreacted epoxy resin, a graft polymer formed by carbon-to-carbon bonding of addition polymer to an aliphatic backbone carbon of the epoxy resin, and addition (vinyl) polymer formed from polymerized ungrafted monomer present.

The vinyl monomer used in the first-stage resinous reaction product can be a single monomer but preferably is a monomer mixture, and includes ethylenically unsaturated acids, particularly acrylic acid and methacrylic acid. Styrene and ethylenically unsaturated acid esters are also useful, such as, for example, ethyl acrylate, butyl acrylate, the corresponding esters of methacrylic acid, and the like. The ethylenically unsaturated acids include acrylic acid and lower alkyl substituted acrylic acids, that is, those acids having ethylenic unsaturation in a position that is alpha, beta, to a single carboxylic acid group. The preferred acrylic acid is methacrylic acid.

To form the graft polymer resinous reaction product, the ethylenically unsaturated monomer component is addition polymerized in the presence of the epoxy resin component. Generally a solvent can be employed that will dissolve all of the reactants and the reaction product such as 2-butoxyl-ethanol-1. The epoxy resin can be an aromatic 1,2-epoxy diepoxide resin that has two terminal epoxy groups per molecule such as a diglycidyl ether of bisphenol A. The initiator preferably is benzoyl peroxide at a concentration of at least 3% by weight of the monomer, and preferably 4% or more, and most preferably from 6% to 7%. Concentrations of benzoyl peroxide of 15% or higher based on monomer may be employed although about 6% to 7% is adequate. With this particular initiator, the polymerization temperature may be in the range from about 110° C. to about 130° C., for practical reaction speeds although higher and lower can be used between about 50° C. and 200° C. Other free radical initiators other than benzoyl peroxide can be used such as t-butyl perbenzoate, lauroyl peroxide, decanoyl peroxide, and caproyl peroxide.

The epoxy resin may be terminated to eliminate substantially all of the epoxy groups, by reacting with terminating agents such as the phenols, carboxylic acids, primary and secondary amines, mercaptans, alcohols, and even water. A base-functional graft polymer resinous reaction product may be made by incorporating an amine in the graft polymer molecule. There are two preferred ways to to this. First, an epoxy resin having epoxide groups available for reaction may be reacted with a primary or a secondary amine, thus introducing tertiary amine groups into the molecule. Second, an unsaturated amine such as dimethylaminoethyl methacrylate may be incorporated in the monomer mixture that is used to form the graft polymer resinous reaction product.

Some representative first stage acid-functional dispersion compositions are as follows, in parts by weight.

TABLE I

| Representative First Stage Dispersion Compositions | | | | | |
|---|---|---|---|---|---|
| Component | Parts By Weight | | | | |
| Epoxy resin EEW 4,000 | 95 | 75 | 60 | 37.5 | 12.5 |
| addition polymerizable monomer including an acrylic acid | 5 | 25 | 40 | 62.5 | 87.5 |
| 2-butoxy-ethanol-1 | 30.4 | 24 | 19 | 12 | 4 |
| n-butanol | 45.6 | 36 | 29 | 18 | 6 |
| dimethyl ethanol amine | 7.6 | 6 | 4.8 | 3 | 1 |

TABLE I-continued

| Representative First Stage Dispersion Compositions | | | | | |
|---|---|---|---|---|---|
| Component | Parts By Weight | | | | |
| (ionizing agent) demineralized water | 310 | 245 | 196 | 122.5 | 70 |
| Total | 493.6 | 411 | 348.8 | 255.5 | 181 |

SECOND STAGE POLYMERIZATION

In accordance with this invention, the addition polymerization of second stage ethylenically unsaturated monomers is conducted in an aqueous dispersion of the graft polymer resinous reaction product from the first stage.

Addition polymerizable ethylenically unsaturated monomer is added to the aqueous dispersion of resinous reaction product together with a suitable initiator, including at least 0.1% benzoin or similar reducing agent and preferably between 0.1% and 5% benzoin based on second stage monomers. Useful second stage vinyl monomers include vinylidene chloride; arylalkenes, such as styrene, vinyl toluene, alpha-methyl styrene, dichlorostyrene, and the like; C 1 to C 15 alkyl acrylate esters, and particularly, lower alkyl acrylates, such as methyl acrylate, butyl acrylate, and lower alkyl methacrylates, such as methyl methacrylate, butyl methacrylate, and, as well, the nonyl, decyl, lauryl, isobornyl, 2-ethyl hexyl, and octyl esters of acrylic or methacrylic acid, also trimethylol-propane, trimethacrylate, 1,6-hexanediol dimethacrylate, and the like; hydroxy lower alkyl acrylates, such as hydroxy propyl acrylate, hydroxy ethyl acrylate, and the like; hydroxy lower alkyl methacrylates, such as hydroxy ethyl methacrylate, hydroxy propyl methacrylate, and the like; amino lower alkyl methacrylates, such as N,N-dimethylamino ethyl methacrylate; amino lower alkyl acrylates, such as N,N-dimethylamino ethyl acrylate; lower alkenyl nitriles, such as acrylonitrile, methacrylonitrile, and the like; lower alkenyl carboxylic acids, such as acrylic acid, methacrylic acid, and the like; lower alkenyl amides, such as acrylamide, methacrylamide, isobutoxymethylacrylamide, and the like; lower hydroxyalkyl alkenyl amides such as hydroxy methyl acrylamide, and the like; lower alkyl butenedioates such as dibutyl maleate, dibutyl fumarate, and the like; vinyl lower alkenoates, such as vinyl acetate, and vinyl propionate, and the like; vinyl chloride and other vinyl halides, isoprene, conjugated butadiene, and the like, etc. Preferred vinyl monomers include styrene, butyl acrylate, ethyl acrylate, and methacrylic acid.

In order to cause the vinyl monomer to polymerize, at least one peroxide initiator is introduced into the aqueous dispersion before or during addition of the second stage monomers. The amount of initiator used in the second stage polymerization typically is in the range from about 0.1 to 20 parts per 100 parts by weight of total second stage ethylenically unsaturated added and preferably from about 0.5 to 10 parts per 100 parts total second stage monomer. Useful initiators comprises organic peroxides. One group of suitable peroxides comprises diacyl peroxides, such as benzoyl peroxide, lauroyl peroxide, acetyl peroxide, caproyl peroxide, butyl perbenzoate, 2,4-dichloro benzoyl peroxide, p-chlorobenzoyl peroxide, and the like. Another group comprises ketone peroxides, such as methyl ethyl ketone peroxide and the like. Another group comprises alkyl hydroperoxide such as t-butyl hydroperoxide, and the like. Another group comprises aqueous hydrogen peroxides. Preferred catalysts are hydroperoxides such as t-butyl hydroperoxide and hydrogen peroxide.

In accordance with this invention, at least about 0.1% of a benzoin derivative reducing agent based on second stage monomers is used in conjunction with the peroxide initiator in the second stage polymerization step. The preferred benzoin derivative is benzoin. Other useful benzoin derivatives include benzoin alkyl ethers and substituted benzoins such as alkyl substituted, either alkyl substituted such as methoxy or ethoxy benzoin, or halogen substituted benzoin. The useful range of benzoin derivative is between 0.1% and 10%, and the preferred range is 1% to 5% benzoin derivative based on the weight of the second stage monomers. With respect to the ratio of benzoin derivative, a weight ratio of about 1 to 20 moles of peroxide per mole of benzoin derivative is useful and a weight ratio of 3 to 10 moles of peroxide to benzoin derivative is preferred. A highly desirable weight ratio is 5 moles of peroxide to 1 mole of benzoin derivative.

In general, in situ polymerization of the second stage ethylenic monomers in accordance with this invention proceeds under liquid phase conditions at temperatures in the range from about 25° to 100° C., and preferably, from 50° C. to 100° C., and most preferably, from about 50° to 80° C. Polymerization times are variable, depending upon starting materials, conditions, and the like; typical reaction times and monomer addition rates range from about 1 to 3 hours, but longer and shorter times are common. The resulting product can contain between about 1 to 5 weight parts of second stage polymerized monomer per about 20 weight parts first stage resinous reaction product.

To make especially durable surface coatings from the resulting dispersed product, aminoplast resins are added as cross-linking agents. Typical aminoplasts include melamine, benzoguanamine, acetoguanamine, and urea resins such as ureaformaldehyde. Commercially available aminoplasts which are water soluble or water dispersible for this purpose include Cymel 301, Cymel 303, Cymel 370, and Cymel 373 (all being products of American Cyanamid, Stamford, Conn., and being melamine based, e.g., hexamethoxymethyl melamine for Cymel 301), and Beetle 80 (products of American Cyanamid which are methylated or butylated ureas). If acrylamide or the like is used as a vinyl monomer in either the first stage, the second stage, or both, in an acid-functional resinous reaction product, the product will be self cross-linking. Another way to introduce cross-linking capability into the reaction mixture and the graft polymer is by utilizing as all or part of the polymerizable monomer, in the initial first stage monomer mixture, an alkyl derivative of acrylamide or a material such as bis maleimide.

The coating composition of the present invention can be pigmented and/or opacified with known pigments and opacifiers. For many uses, including food uses, the preferred pigment is titanium dioxide. Generally, the pigment is used in a pigment-to-binder ratio of 0.11:1 to 1:1, by weight. Thus titanium dioxide pigment can be incorporated into the composition in amounts of from about 5% to 40% by weight, based on solids in the composition.

The resulting aqueous coating composition can be applied satisfactorily by any conventional method known in the coating industry. Thus, spraying, rolling, dipping, flow coating or electrodeposition applications can be used for both clear and pigmented films. Often spraying is preferred. After application onto a metal substrate, the coating is cured thermally at temperatures in the range from about 95° C. to about 235° C. or higher, for periods in the range from 1 to 20 minutes, such time being sufficient to effect complete curing as well as volatilizing of any fugitive component therein. Further, films may be air dried at ambient temperatures for longer periods of time.

For metal sheet substrates intended as beverage containers and particularly for carbonated beverages such as beer, the coatings should be applied at a rate in the range from 0.5 to 15 milligrams of polymer coating per square inch of exposed metal surface. To attain the foregoing, the water-dispersible coating as applied can be as thick as 1/10th to 1 mil.

The merits of this invention are further illustrated in the following examples.

EXAMPLE 1

First stage resinous reaction products containing an epoxy-acrylic graft copolymer were produced as follows:

(a) 80% By Weight Epoxy Resinous Reaction Product

In this procedure, 18,099 lbs. of an aromatic epoxy resin having an epoxy equivalent weight of 5,300 and a viscosity of $Z_2$–$Z_3$ (40% in 2-butoxy-ethanol-1) and containing 482 lbs. of xylene are charged to the reactor. The mixture is sparged with nitrogen and formed into a mixture with 5,073 lbs. of 2-butoxy-ethanol-1 and 8,725 lbs. of n-butanol. The mixture is brought to a temperature in the range from about 240° F. to 245° F. (About 115° C.–118° C.).

In a separate weigh tank, a mixture is made of the following:

| Ingredients | Parts by Weight |
| --- | --- |
| methacrylic acid | 2,997 lbs. |
| styrene | 1,565 lbs. |
| ethyl acrylate | 40 lbs. |
| wet benzoyl peroxide (78% dry bases) | 400 lbs. |
| 2-butoxy-ethanol-1 | 1,170 lbs. |

With the contents of the reactor at a temperature in the range from about 240° F. to 245° F. (about 115° C.–118° C.), and while mixing, the addition of the monomer mixture is initiated and continued for about 2 hours, at a uniform rate of about 45 lbs. per minute, with the agitation continuing. The contents of the reactor are then held at the 240° F.–245° F. (about 115° C.–118° C.) temperature for about 3 hours. At the end of this time, the viscosity is K–R, in 1/1, resin/m-pyrol (N-methylpyrolidone). The non-volatiles are in the range from about 56% to about 60%, preferably 58.5%. Oxirane value (N.V.) is about 0.1–0.3, preferably 0.2.

During the three hours period in the reactor, a reducing tank is loaded with 5,580 gallons of demineralized water (46,488 lbs.). Then, 2,182 lbs. of dimethyl ethanol amine and 2,762 lbs. of 2-butoxy-ethanol-1 are added to the water in the reducing tank. The contents of the reactor are then transferred to the reducing tank over a period of 30 to 45 minutes, with continued heating and agitation for about a half hour. Then an additional quantity of demineralized water, 922 gallons (7,672 lbs.), is added to the reducing tank, and the contents of the reactor are cooled to the range from 90° F. to 100° F.

(about 32°–38° C.), to provide the product A. At this point, the weight per gallon of the product A, should be about preferably 8.5 lbs., with a non-volatiles content of preferably about 22.5%. The viscosity as determined in a No. 4 Ford cup at 25° C. (77° F.) should be in the range from 50 to 60, and the pH should be preferably 7.3. The Base Number (N.V.) should be preferably about 60. The Acid Number (N.V.) is about 85.

The epoxy resin contributes about 80% by weight to the polymeric solids of the resinous reaction product, and the first stage addition polymerizable monomer contributes about 20% to the reaction product. The resulting water dispersed resinous reaction product A has three solids components, namely:
  (a) unreacted modified epoxy resin, about 38% by weight of total solids;
  (b) graft polymer in which addition polymer is grafted to aliphatic backbone carbon atoms of the epoxy resin that have either one or two H bonded thereto in the ungrafted state, about 50% by weight of solids in product A; and
  (c) (ungrafted) addition polymer, about 12% by weight of the product A solids. The percentage figures for the respective solids components are approximations based on solvent partition and other analytical techniques.

(B) 75% By Weight of Epoxy Resin Resinous Reaction Product

A graft polymer resinous reaction product is prepared having its solids content derived from an initial raw material comprising about 75% epoxy resin and about 25% ethylenically unsaturated monomers. The graft polymer resinous reaction product is prepared in the following manner. About 4,233 lbs. of an aromatic epoxy resin having an epoxy equivalent weight of 5,300 and a viscosity of $Z_2$–$Z_3$ (40% in 2-butoxy-ethanol-1) and containing 100 lbs. of xylene is mixed in a agitated reactor with a solvent system made up of 1,155 of 2-butoxy-ethanol-1 and 2,252 lbs. of n-butanol. Mixing is continued while the epoxy resin is brought to 240° F.–245° F. (115° C.–118° C.), with nitrogen sparging.

In a separate vessel, the following are charged, to form a mixture:

| | | |
|---|---|---|
| methacrylic acid | 878 lbs. | |
| styrene | 460 lbs. | |
| ethyl acrylate | 14 lbs. | |
| benzoyl peroxide (BPO) | 115 lbs. | (as is basis, 78% active, in water) |
| 2-butoxy-ethanol-1 | 347 lbs. | |

The BPO amounts to about 6.6% by weight of the total first stage monomer present. The monomers are thoroughly mixed, then the mixture is gradually added to the reactor containing the epoxy resin, at a uniform rate, over a period of about three hours, while maintaining an essentially constant temperature. The reactor contents are then held at 240° F.–245° F. (115° C.–118° C.) for about three hours. The reaction mixture is then cooled to 210° F. (85° C.).

During the three hours hold period, the following are charged to a mixing tank:

| | |
|---|---|
| demineralized water | 9,564 lbs. |
| 2-butoxy-ethanol-1 | 524 lbs. |
| dimethyl ethanolamine | 377 lbs. |

After thorough mixing and heating to about 120° F., 7,810 lbs. of the above reaction product is added to the mixing tank to form an aqueous dispersion referred to hereafter as product B. The resinous reaction product B is a mixture formed from the addition polymerization of 1,352 parts by weight of the mixture of addition polymerizable monomers in the presence of 4,113 parts by weight, approximately, of the epoxy resin, and in the presence of about 6.6% by weight of BPO initiator based on total monomer. This amount is far above that used for ordinary addition polymerizations, and is effective simultaneously to cause carbon-to-carbon grafting of addition (vinyl) polymer to the aliphatic backbone carbons of the epoxy resin and addition (vinyl) polymerization of the monomer. The grafting is believed to be due to the hydrogen extracting ability of the BPO at the reaction temperature employed. The ionization is sufficient in extent that the product B solids can be characterized as dispersoid in nature. The dispersion is opalescent and remains stable over a period of many months at room temperature, without any need for agitation to redistribute the particles. The Acid Number of product B on a solids basis (on non-volatiles, i.e., NV) is about 104. The Base No. (mg. of KOH/gm. of solids) is about 53.2 (NV), viscosity is 72 seconds as measured in a No. 4 Ford cup at 25° C. N.V. content is about 24.7%.

(C) 70% By Weight of Epoxy Resin Resinous Reaction Product

Product C is made similarly to that of product A and product B except 5% of the epoxy resin is replaced by styrene, so the epoxy content in product C is roughly 70%. The remaining is consisted of 16.7% styrene, 13% methacrylic acid and 0.3% ethyl acrylate.

(D) Resinous Reaction Product (Epoxy Advancement)

To a 5 liter flask fitted with an agitator, thermometer, and nitrogen gas inlet tube, 1084 grams of low molecular weight epoxy (Epon 828, Shell) 614 grams Bisphenol A, 57 grams xylene and 310 grams 2-butoxy-ethanol-1 was charged. This mixture was then heated to 85° C. with a nitrogen sparge present. At 85° C., 0.51 g. of sodium acetate dissolved in 2.5 g. H$_2$O was added to the flask. A 17" Hg vacuum was then pulled on the reaction vessel and the contents were heated to 140° C. The heat was then turned down and vacuum continued until 28.7 grams of volatiles were removed from the reaction flask. The reaction mixture was then held at 175° C. until a viscosity of $Z_2$ at 40% in 2-butoxy-ethanol-1 was reached. At this time 170 g. 2-butoxy-ethanol-1 was added and the reaction product was cooled to 155° C. when 826 grams of normal butanol was added over a period of time to allow the solvent to mix in without refluxing heavily.

The reaction product temperature was then allowed to drop to 117° C. A mixture of 283 g. methacrylic acid, 148 grams styrene, 4 grams ethyl acrylate, 38.5 grams benzoyl peroxide and 111 grams 2-butoxy-ethanol-1 were added to the reaction flask over a period of 2 hours. At the end of the addition 62 grams of n-butanol was added. The reaction product was then held at 117°–118° C. for 3 hours. At the end of 3 hours, 2,683 grams of the reaction product was added to a mixture of 3,411 grams DM H$_2$O, 193 grams 2-butoxy-ethanol-1, and 152 grams of dimethyl ethanol amine, which was then heated to 50° C. An additional 560 grams of DM H₂O was then added 10 minutes later. The constants of this dispersion were: NV—22.9%, No. 4 Ford Cup visc.—31 seconds; Acid Number—83.6 on NV; Base Number—64.3 on NV. This product was mixed overnight and allowed to cool to room temperature. The dispersed product was useful in formulating stable, sprayable beverage can coating compositions and is designated product D.

SECOND STAGE MONOMER POLYMERIZATION

EXAMPLE 2

In accordance with this invention, a 1988 gm. of the product D dispersion product (20% NV) was charged into a 5-liter round bottom flask fitted with an agitator, thermometer and nitrogen sparge tub. 1.3 gm. of benzoin is added followed by a monomer mixture of 114.8 gm. of styrene and 17.3 gm. of methacrylic acid. The reaction mixture is then heated to 70° C., at which time 2.1 gm. of hydrogen peroxide (50% in water) was added. The reaction mixture was then heated to 86°–88° C., and held at that temperature for 6 hours. At the end of the 6 hours hold, heating was discontinued and 13.3 gm. of deimethylethanol amine and 75 gm. of water were added to the reaction mixture. The non-volatile of the final product is 24.7%, viscosity No. 4 Ford cup—27 seconds, % free styrene—0.2%.

EXAMPLE 3 and 32 gm. of water were added and heating discontinued. The final constants are: non-volatile 24%, Viscosity No. 4 Ford cup—20 seconds and free styrene—0.19%.

EXAMPLE 4

In accordance with this invention, 2775 gm. of the product D dispersion (20% NV) was charged into a round bottom similar to that in Example 5. A monomer mixture consisted of the following: 165 gm. of styrene, 25 gm. of methacrylic acid and 1.9 gm. of benzoin was added to the dispersion, and the reaction mixture heated to 65° C. At that temperature, 11.5 gm. of t-butylhydroperoxide (70% active in H₂O) and 61 gm. of water were added and the temperature of the reaction mixture raised to 85° C. After 2 hours at 85° C., 5.8 gm. of t-butylhydroperoxide (70% active in water) and 37 gm. of water were added, and the reaction mixture held at 85° C. for another hour. At that time another shot of 5.8 gm. t-butylhydroperoxide (70% active in water) and 37 gm. of water were added, and the reaction mixture held at 85° C. for another hours. Heating was then discontinued and 18 gm. of dimethylethanolamine and 32 gm. of water were added. The final constants are: volatile—22.8%, viscosity No. 4 Ford cup—13 seconds and free styrene—0.2%.

In the following examples 5–9 in accordance with this invention, Table I lists some of the properties of examples 5–9 made with benzoin. In Table II, spray application properties as well as blush properties with 1% boiling Joy are listed for examples 5–9.

TABLE I

| Example | Base Material | BC/n-BuOH | Wt. % Benzoin Based On Monomer | Mole Peroxide Based On Benzoin (1 mole) | Benzoin Addition | Peroxide Addition | N.V. | Vis. No. 4 Ford Cup, Secs. | % Free Styrene | Example |
|---|---|---|---|---|---|---|---|---|---|---|
| 5 | Prod. A | 50/50 | 1 | (tBHP-70) | in monomer | Shots | 23.1 | 24.5 | — | — |
| 6 | Prod. D | 25/75 | 1 | (H₂O₂) 5 | Batch | Batch | 24.7 | 27 | 0.2 | 5 |
| 7 | Prod. D | 25/75 | 1 | tBHP-70 20 | in monomer | Shots | 22.8 | 13 | 0.2 | 7 |
| 8 | Prod. D | 25/75 | 1 | (H₂O₂) 5 | in monomer | Batch | 24 | 20 | 0.19 | 6 |
| 9 | Prod. D | 25/75 | 1 | tBHP-70 10 | in monomer | Batch | 23.9 | 16 | 0.55 | — |

TABLE II

| Example | N.V. | No. 4 Ford Cup Visc. | MEQ | mg Coverage | ma Enamel Rater | Blister | Blush in 1% Boiling Joy (15 Min.) 1 Min. at 350° F. | 1 Min. at 370° F. | 1 Min. at 400° F. |
|---|---|---|---|---|---|---|---|---|---|
| 5 | — | — | — | 90–100 | | 140 | | | |
| 6 | 19.7 | 24 | 124 | 100 | 6.5 | 200–210 | 2* | 0 | 0 |
| 7 | 19.7 | 22 | 130 | 90 | 3 | 170–180 | 2 | 1 | 0 |
| 8 | 19.4 | 22 | 127 | 100 | 5 | 210–220 | 1–2 | 0 | 0 |
| 9 | 19.9 | 19 | 132 | 100 | 10 | 200–210 | 2 | 0 | 0 |

*10 - Worst
0 - Best

In accordance with this invention, 2850 gm. of the product D dispersion product (20%NV) was charged into a 5-liter round bottom flask similar to that in Example 2. A monomer mixture of 165 gm. of styrene and 25 gm. of methacrylic acid and 1.9 gm. of benzoin was added to the flask and the reaction mixture heated to 65° C. At that time, 3 gm. of hydrogen peroxide (50% solution in H₂O) was added, and the reaction mixture heated to 85° C. and held at 85° C. for 6 hours. At the end of the 6 hour hold, 18 gm. of dimethylethanolamine

EXAMPLE 10

Second Stage Polymerization

In contrast to this invention, a coating composition was produced using a water-soluble redox initiator system.

A reaction flask is charged with 6,980 parts by weight (22.5% N.V.) of the water-dispersed reaction product (A) produced in accordance with the process described in the first stage of Example 1, together with 271 parts by weight of styrene. Agitation is initiated to insure thorough mixing, and the flask is sparged for about a half hour with nitrogen. The temperature is then raised to 30° C., and when this temperature is attained, a previously prepared mixture is added to the flask, containing 2.4 parts by weight of sodium sulfoxylate formaldehyde in 21 parts by weight of demineralized water. The agitation is continued for two minutes, then a previously prepared mixture is added, containing 2.6 parts of t-butyl hydroperoxide in 20.5 parts of demineralized water. The agitation is then continued for about 10 minutes, and then the temperature is raised to 70° C. and the contents of the flask are held at that temperature for about 3 hours. At the end of this hold period, a previously prepared mixture is added to the flask, and 62 parts of demethylethanolamine flask are then cooled to permit recovery of the coating composition.

At this point, the composition has a non-volatiles content of 20.6% by weight, and a viscosity of 83 seconds as measured on a No. 4 Ford cup at 25° C. (77° F.). The Acid Number (N.V.) of the reaction product is 72. The Base Number is 79. The polymeric solids content is derived from about 72% of epoxy resin and ethylenically unsaturated monomer, about 28%, with the second stage added styrene contributing about 15% of total solids.

EXAMPLE 11

Second Stage Polymerization

In a manner similar to Example 10, a coating composition produced by a redox system where the added ethylenically unsaturated monomer is a mixture of styrene and methacrylic acid.

A reaction flask is charged with 2,793 pounds of a reaction product produced in accordance with the process described in the first stage of Example 3, product A, together with 100 parts by weight of styrene and 15 parts by weight of methacrylic acid. These materials are mixed in the reaction flask for about 30 minutes, during which a nitrogen sparge is maintained.

After the ingredients are thoroughly mixed, the temperature is raised to 30° C. At that time, 1.0 parts by weight of sodium sulfoxylate formaldehyde and 9 parts by weight of demineralized water are added to the reaction flask. The contents of the flask are then held for two minutes, and then 1.1 parts by weight of 90% tertiary butyl hydroperoxide and 8.7 parts by weight of demineralized water are added. The temperature is permitted to rise for about 10 minutes until the contents of the reaction flask are at about 70° C., and then they are held at that temperature for about two hours.

After the two hour holding period, there are added to the flask 22 parts by weight of deimethyl ethanol amine and 865 parts by weight of demineralized water. The contents of the reaction flask are mixed thoroughly and permitted to cool at 30° C.

The product contains 20.26% by weight of non-volatiles, and has a viscosity of 19 seconds as measured on a No. 4 Ford cup at 25° C. The Base Number (N.V.) is 53, and the Acid Number (N.V.) is 85.

This product is characterized by the fine particle size of its solids content, and by its great stability upon storage. The small amount of methacrylic acid added during the second stage polymerization results in an acid functionality that is ionized by the presence of the subsequently added amine.

The second stage monomer contributed about 15% of total solids present in the final product, with about 13% being furnished by the styrene and 2% by the methacrylic acid.

EXAMPLE 12

A second stage process comprising 75:25 first stage solids to second stage solids ratio; approximately 22 styrene to 3 methacrylic acid, was as follows:

2,545 grams of the product D dispersion product was charged to a 5 liter flask fitted with an agitator, thermometer and nitrogen sparge tube. 277 grams of demineralized water, 165 grams of styrene and 25 grams of methacrylic acid were then charged to the flask. This mixture was then agitated 30 minutes while sparging with nitrogen. After 30 minutes the mixture was heated to 52° C. and the heat was turned off. 2 grams sodium solfoxylate formaldehyde dissolved in 20 grams of tertiary butyl hydroperoxide diluted with 20 grams of demineralized water was added to the flask. flask. Ten minutes later the heat gas applied and the reaction material heated to 80° C. and held 3 hours and 20 minutes. This product was then cooled below 30° C. with agitation. The final constants were: NV—24.7%, Visc. No. 4 Ford cup—11.5 seconds, Acid Number on NV—90.8, Base Number—49.5 on NV.

The resultant product was further formulated for use as a can coating by the addition of a suitable amount of crosslinker, Cymel 303, and also by small additions of surfactant and other modifiers. The final coating was sprayed on the interior of cans. At a film weight of 115 to 125 mg. per can, the product showed good coverage (enamel rater value of 21), and at a film weight of 160 mg per can, the first signs of blistering were observed.

When the products from examples 10, 11, and 12 were exposed to harsh environment like 1% boiling Joy solution (15 minutes), the coating film turns milky white. Samples made with sodium sulfoxylate formaldehyde blushed badly regardless of curing temperature.

EXAMPLE 13

In accordance with this invention, product C was used as starting material. 3000 gm. of RP-C (33.5% NV) was charged into a reactor flask. A monomer mixture was made with 31.5 gm. of styrene, 152.4 gm. of ethyl acrylate, 149.6 gm. of methyl methacrylate, 4 gm. of methacrylic acid, 6.8 gm. of benzoin was added and the reaction mixture heated to 65° C. At that time, 9.6 gm. of t-butylhydroperoxide (70% active in water) and 17.9 gm. of water was added, and the reaction mixture heated to 85° C. The reaction mixture was held at that temperature for three hours, and 9.6 gm. of t-butylhydroperoxide (70% active in water) and 17.9 gm. of water were added. The reaction mixture was held at 85° C. for two more hours and heating discontinued. The final non-volatile of the material is 38.8%. This material when formulated gave an excellent roll coating for can ends.

EXAMPLE 14

To a 5 liter flask fitted with an agitator, thermometer and nitrogen gas inlet tube, 970 gm. of liquid epoxy (of which 921.5 gm. is Epon 828 and 48.5 gm. is xylene), 523 gm. bisphenol A and 263 gm. 2-butoxy-ethanol-1 was charged. This mixture was then heated to 85° C. with a nitrogen sparge present. At 85° C., 0.45 gm. of sodium acetate dissolved in 4 gm. H$_2$O was added to the flask. A 17" Hg. vacuum was then pulled on the reaction vessel and the contents were heated to 140° C. The heat was then turned down and vacuum continued until 21 grams of volatiles were removed from the reaction flask. The reaction mixture was then held at 175° C. until a viscosity of Z$_2$ at 40% in 2-butoxy-ethanol-1 was reached. At this time 105 gm. of 2-butoxy-ethanol-1 was added and the reaction product was cooled to 155° C. when 688 gm. of normal butanol was added over a period of time to allow the solvent to mix in without refluxing heavily. The reaction product temperature was then allowed to drop to 117° C. A mixture of 317 gm. methacrylic acid, 302 gm. styrene, 21 gm. ethyl acrylate, 49.2 gm. benzoyl peroxide (78% active), 6.6 gm. tert-butyl perbenzoate and 111 gm. of n-butanol were added to the reaction flask over a period of 2 hours. At the end of the addition 62 gm. of n-butanol was added. The reaction product was then held at 117°-118° C. for 3 hours. At the end of 3 hours, 2,475 gm. of the reaction product was added to a mixture of 3,587 gm. of DM H$_2$O, 166 gm. of dimethyl ethanol amine, which was then heated to 50° C. An additional 700 grams of DM water was then added 10 minutes later. The nonvolatile for this dispersion was 23.4%. This product was mixed overnight and allowed to cool to room temperature.

6,000 gm. of the dispersion was charged into a 5-liter round bottom flask fitted with an agitator, thermometer and nitrogen sparge tube. 575 gm. of DM H$_2$O was added followed by a solution mixture of 293 gm. styrene, 57 gm. ethyl acrylate, 7 gm. benzoin and 108 gm. n-butanol. The reaction mixture is then heated to 85° C. at which time 21 gm. of t-butyl hydroperoxide (70% active in H$_2$O) and 40 gm. of DM H$_2$O were added. The reaction mixture was then heated at 85° C. for 2 hours. At that time 10.5 gm. of t-butyl hydroperoxide (70% active in H$_2$O) and 20 gm. of DM H$_2$O were added, and the reaction mixture was held at 85° C. for two more hours. At the end of the 2 hours hold, another shot of 10.5 gm. t-butyl hydroperoxide (70% active in H$_2$O) and 20 gm. of DM H$_2$O was added, and the reaction mixture was held another 2 hours at 85° C. After the hold, the reaction mixture was let cool to room temperature. The nonvolatile of the final product is 24.4%, viscosity No. 4 Ford cup—19 seconds, acid number (on NV) 78.2, base number (on NV) 53.7, % neutralization 68.6%, MEQ 95.6, % free styrene 0.13% and % free methacrylic acid 0.035%.

The foregoing is not intended to be limiting except by the appended claims.

I claim:

1. In a process for polymerizing ethylenically unsaturated monomers in the presence of an aqueous dispersed resinous reaction product produced in a first stage addition polymerization of ethylenically unsaturated monomer in the presence of an epoxy resin and in the presence of at least 3% by weight benzoyl peroxide based on monomer, wherein the resinous reaction product comprises epoxy resin, addition polymer of polymerized monomers, and grafted polymer of addition polymer grafted to the epoxy resin wherein the resinous reaction product contains between 30% to 90% by weight of said epoxy resin and is dispersed in water, the improvement comprising:

polymerizing second stage ethylenically unsaturated monomers in the presence of said resinous reaction product on a weight basis of between 1 to 5 weight parts of second stage monomer per 20 weight parts of first stage resinous reaction product, wherein said second stage monomers are polymerized in the presence of peroxide catalyst in combination with about 0.1% and 10% of a benzoin derivative reducing agent based on the weight of second stage monomer polymerized to produce a resulting product containing between about 1 to 5 weight parts of second stage polymerized monomer per about 20 weight parts of first stage resinous reaction product.

2. The process of claim 1 wherein the benzoin derivative is benzoin.

3. The process in claim 1 wherein about 10 moles of peroxide are used per mole of benzoin derivative reducing agent.

4. The process in claim 1 wherein the peroxide is a hydroperoxide.

5. The process in claim 1 wherein the aqueous dispersoid comprises an epoxy polymer, an addition polymer, and an epoxy graft polymer containing grafted addition polymer.

6. The process in claim 5 wherein the benzoin derivative is benzoin.

7. The process in claim 6 wherein about 4 to 6 moles of peroxide are used per mole of benzoin derivative.

8. The process in claim 7 wherein the peroxide is a hydroperoxide.

9. The product produced by the process in claim 1.

10. The product produced by the process in claim 5.

* * * * *